United States Patent
Ogawa

(10) Patent No.: US 7,318,714 B2
(45) Date of Patent: Jan. 15, 2008

(54) CORE FOR MANUFACTURING PNEUMATIC TIRES

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/564,890

(22) PCT Filed: Jul. 14, 2004

(86) PCT No.: PCT/JP2004/010035

§ 371 (c)(1),
(2), (4) Date: Jul. 31, 2006

(87) PCT Pub. No.: WO2005/009724

PCT Pub. Date: Feb. 3, 2005

(65) Prior Publication Data

US 2007/0009625 A1 Jan. 11, 2007

(30) Foreign Application Priority Data

Jul. 24, 2003 (JP) .............................. 2003-201081

(51) Int. Cl.
*B29C 33/76* (2006.01)
(52) U.S. Cl. ......................................... 425/54; 425/56
(58) Field of Classification Search ................ 425/54, 425/55, 56, 57; 156/110.1
See application file for complete search history.

(56) References Cited

U.S. PATENT DOCUMENTS

| | | | | |
|---|---|---|---|---|
| 1,247,434 A | * | 11/1917 | McCurry | 425/56 |
| 1,366,750 A | * | 1/1921 | Smith et al. | 425/56 |
| 1,373,229 A | * | 3/1921 | Fording | 425/56 |
| 1,405,470 A | | 2/1922 | Wheatley | |
| 1,536,022 A | * | 4/1925 | Kuhn | 425/56 |
| 1,616,954 A | * | 2/1927 | Dykes | 425/395 |
| 1,670,446 A | * | 5/1928 | Gammeter | 425/54 |
| 3,123,122 A | * | 3/1964 | Beckadolph | 425/582 |
| 4,075,054 A | | 2/1978 | Sons, Jr. | |
| 4,116,596 A | | 9/1978 | Pizzorno et al. | |
| 4,286,942 A | * | 9/1981 | Fuzioka et al. | 425/54 |
| 6,113,833 A | | 9/2000 | Ogawa | |
| 2005/0011599 A1 | | 1/2005 | Masaoka et al. | |

FOREIGN PATENT DOCUMENTS

| | | |
|---|---|---|
| GB | 1915 09454 | 3/1916 |
| JP | A 07-125506 | 5/1995 |

(Continued)

*Primary Examiner*—James P. Mackey
(74) *Attorney, Agent, or Firm*—Oliff & Berridge PLC

(57) ABSTRACT

A rigid core for manufacturing pneumatic tires includes a plurality of segments (2, 3), and a pair of retainer rings (5) engaging with a toroidal assembly (4) of the segments (2, 3) axially from both sides thereof, so as to hold the segments (2, 3) in the assembled state. The core defines the inner surface of the tire from formation of the tire up to the completion of the vulcanization thereof. The segments (2, 3) are each detachably divided into a center portion (2a, 3a) corresponding to the widthwise center portion of the tire and side portions (2b, 3b) corresponding to the widthwise side portions thereof. The core allows smooth removal of the segments even when the maximum inner surface width at the sidewall portion of the product tire is substantially larger than the minimum inner surface width at the bead portions thereof.

14 Claims, 4 Drawing Sheets

| | FOREIGN PATENT DOCUMENTS | | | | |
|---|---|---|---|---|---|
| JP | A 11-034062 | 2/1999 | JP | A 2002-018856 | 1/2002 |
| JP | A 2001-150447 | 6/2001 | WO | WO 03/031206 A1 | 4/2003 |
| JP | A 2001-198989 | 7/2001 | | | |

* cited by examiner

CORE FOR MANUFACTURING PNEUMATIC TIRES

TECHNICAL FIELD

The present invention relates to a core used for manufacturing pneumatic tires, comprising a plurality of rigid segments that are assembled into a toroidal shape, for defining the inner surface of a tire from the green tire formation up to the completion of vulcanization, and provides in particular a novel technology that allows a smooth and facilitated removal of the segments out of the vulcanized tire.

BACKGROUND ART

Conventional core of this type, as generally used for manufacturing pneumatic tires, is disclosed, for example, in Japanese Patent Publications JP-11-34062A1, JP-2001-150447A1, and JP-2001-198989A1. The core for manufacturing pneumatic tires disclosed in these patent documents comprises two types of segments, i.e., large segments and small segments, which are alternately arranged in contact with each other and assembled into a toroidal shape, and this assembly is maintained in toroidal shape by means of a pair of retainer rings that are engaged with the assembly from both sides in the axial direction and connected to each other.

With the core for manufacturing pneumatic tires constructed as explained above, after completion of vulcanization with respect to a green tire that has been formed on the outer peripheral surface of the core, the retainer rings are removed so as to release each of the segments from their restrained state. Then, for example, the small segments are initially removed toward the inner peripheral side of the vulcanized tire one by one, with a predetermined sequence, and the large segments are subsequently removed toward the inner peripheral side of the vulcanized tire one by one, with a predetermined sequence, thereby allowing removal of the segments from the vulcanized tire in their disassembled state.

Patent Document 1: Japanese Patent Publication JP-11-34062A1

Patent Document 2: Japanese Patent Publication JP-2001-150447A1

Patent Document 3: Japanese Patent Publication JP-2001-198989A1

With such a conventional technology, each segment has an outer peripheral surface shape that corresponds to the inner contour shape of the product tire in its cross-section, and has the maximum width at the portion of the segment corresponding to the sidewall portion of the tire, which is made larger than the minimum width at the portion of the segment corresponding to the bead portion of the tire. Thus, when each segment is removed toward the inner peripheral side of the tire, it is necessary to forcibly enlarge the relative width between the bead portions of the vulcanized tire, to such an extent as to allow passage of the maximum width portion of the segment. This process is a highly important for avoiding undesirable chipping-off of the tire bead portions by the edge, in the circumferential direction, of the large segment having a planer shape in the form of a sector.

However, when the core is used to form and vulcanize a tire having the maximum inner surface width at the sidewall portions, which is significantly larger than the minimum inner surface width at the bead portions, such as tires having a cross-sectional shape resembling a beret-hat as disclosed in WO 2003/031206A1, there arises a problem that a smooth removal of the segment is practically impossible even if the relative width between the bead portions of the tire is forcibly enlarged to the maximum extent so as to avoid damages or deformation of the bead portions.

The present invention has been accomplished in order to eliminate the problem of the conventional technology as mentioned above. It is an object of the present invention to provide a core for manufacturing pneumatic tires, which allows removal of each segment toward the inner peripheral side of the product tire to be performed positively and in a facilitated manner, even when the tire has the maximum inner surface width at the sidewall portions, which is significantly larger than the minimum inner surface width at the bead portions.

DISCLOSURE OF THE INVENTION

According to the present invention, there is provided a core for manufacturing pneumatic tires, which comprises a plurality of segments that are aligned in contact with each other to form a toroidal assembly, and a pair of retainer rings engageable with the assembly axially from both sides so as to retain the plurality of segments in an assembled state, wherein the core defines an inner surface of a tire from its formation up to completion of vulcanization of the tire. The segments are each divided into a center portion that corresponds to a center portion of the tire in its width direction, and side portions that correspond to both side portions of the tire, respectively, wherein the center portion and the side portions of each segment are detachably connectable to each other.

With the core for manufacturing pneumatic tires according to the present invention, the center portions of the segments, which are not in contact with the sidewall portions and the bead portions of the tire, are initially removed toward the radially inner side of the tire so as to sufficiently reduce the total cross-sectional area of the remaining segment portions in the widthwise cross-section of the tire. Subsequently, the remaining side portions of each segment are removed toward the radially inner side of the tire, either under a predetermined sequence or jointly. Therefore, irrespective of the cross-sectional shape of the product tire, the removal of the segment toward the radially inner side of the tire can be positively and smoothly performed without causing damages or deformation of the tire.

In this connection, particularly when the side portions of each segments are removed individually, under a predetermined sequence, a forced deformation of the bead portions for enlarging the width may be made unnecessary depending upon the maximum width at each side portion, the minimum width at the tire bead portions, etc.

In the core for manufacturing pneumatic tires according to the present invention, it is preferred that each segment has parting surfaces between the center portion and the side portions, wherein the parting surfaces of the segments are arranged in common planes when the segments are aligned as the toroidal assembly. In this instance, it is possible to use appropriate mechanical means for automatically assembling the segments into a toroidal core, and automatically disassembling and removing the segments, rapidly and in a very facilitated manner.

It is also preferred that the toroidal assembly of the segments comprises small segments having a plane width that is substantially constant or gradually decreased radially outwards, and large segments having a plane width that is gradually increased radially outwards, wherein the small segments and the large segments are alternately arranged in a circumferential direction. In this instance, when the segments are removed from the product tire, all of the small segments are initially removed and the large segments are then removed so as to smoothly perform disassembling and removal of the core.

In the core for manufacturing pneumatic tires according to the present invention, it is preferred that each segment further comprises a base portion integrally arranged on an inner peripheral side of the center portion, wherein the side portions and the base portion of each segment are provided with positioning/assembling portions for the side portions, respectively. In this instance, for each segment of the core, it is possible to perform a predetermined positioning of the center portion and the side portions of each core positively and in a facilitated manner, and perform positioning, in an assembled state of the segments, of the side portions with a predetermined accuracy both in the circumferential direction and in the axial direction.

The positioning/assembling portions may comprise at least one kind of male/female fitting portions. In this instance, the predetermined positioning accuracy can be readily achieved and removal of the center portion relative to the side portions can be significantly facilitated with a simple structure.

Alternatively to such positioning/assembling portions, or in addition thereto, each segment may be provided with a connector means for connecting the side portions to the base portion. In this instance, it is possible to even more positively position and connect the side portions relative to the base portion and sufficiently avoid undesirable dislocation of the side portions.

The above-mentioned advantage of the core for manufacturing pneumatic tires according to the present invention is highly effective when each segment has a maximum width at its portions corresponding to sidewall portions of the tire, and a minimum width at its portions corresponding to bead portions of the tire, wherein the maximum width is larger than the minimum width by at least 40 mm.

In other words, if the difference in width is less than 40 mm, the width between the tire bead portions can be forcibly enlarged to such extent as to allow removal of the entirety of each segment as a whole, without causing a permanent deformation of the bead portions or the like, and it would be thus less meaningful for each segment to be made as a divided structure.

BEST MODE FOR CARRYING OUT THE INVENTION

Figure 1:
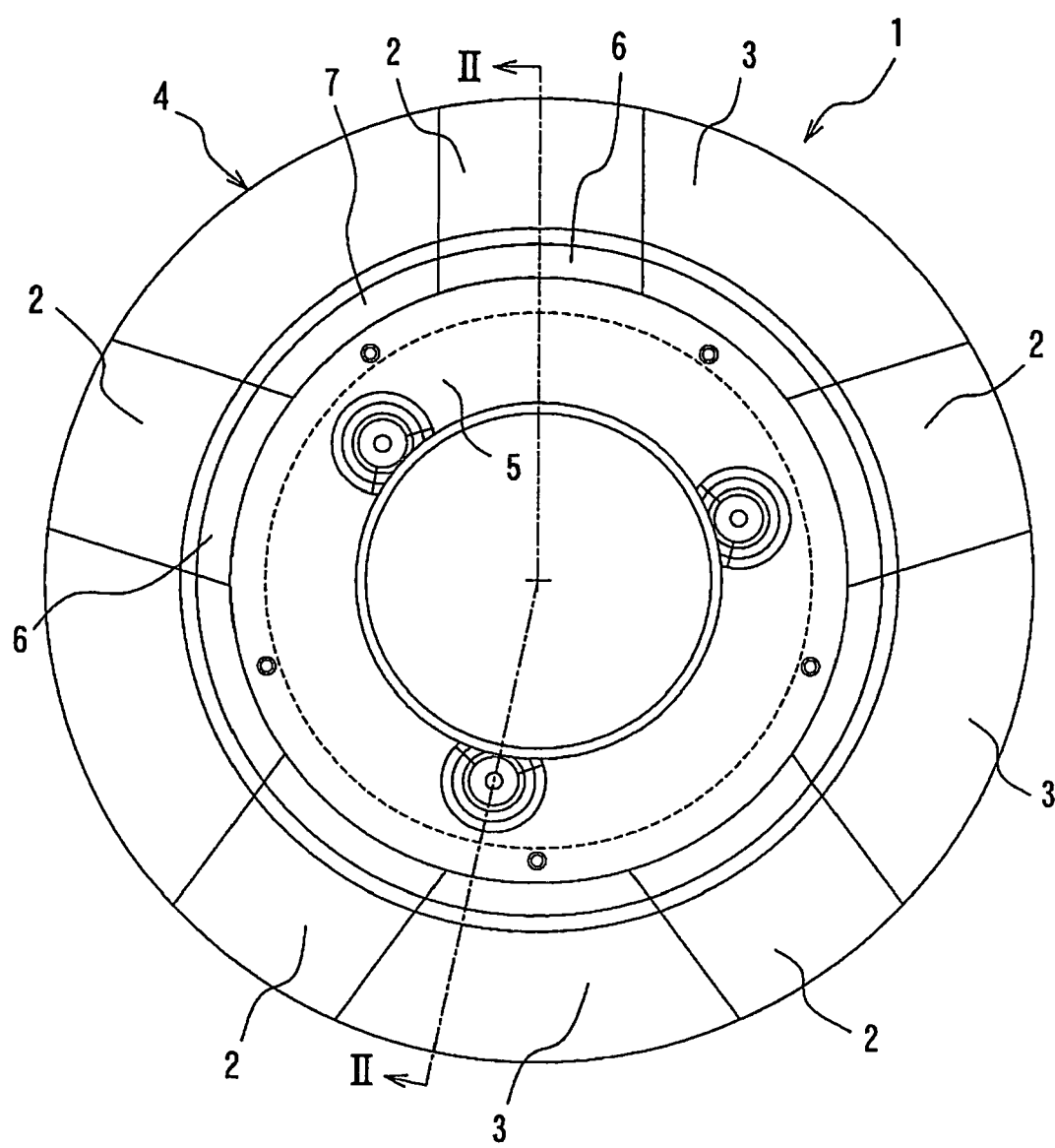
FIG. 1 is a plan view showing a core for manufacturing pneumatic tires according to a preferred embodiment of the present invention.
Figure 2:
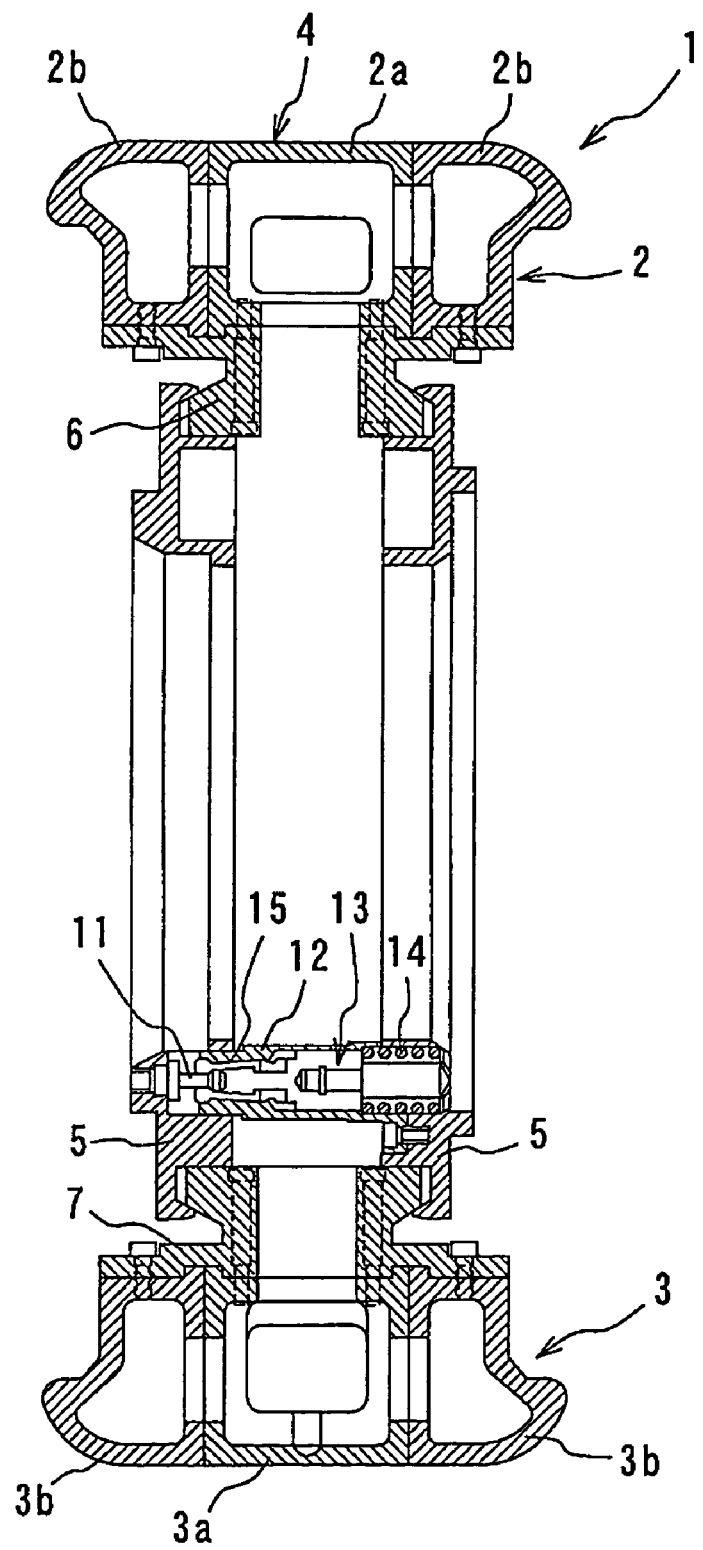
FIG. 2 is a sectional view taken along the line II-II in FIG. 1.

In the embodiment shown in FIG. 1, the core 1 for manufacturing pneumatic tires according to the present invention is comprised of ten segments in total, which are assembled into a toroidal shape. These segments include five small segments 2 of the same shape, each having a plane width that is substantially constant or gradually decreased radially outwards, and five large segments 3 of the same shape, each having a plane width that is gradually increased radially outwards. The small segments 2 and the large segments 3 are alternately arranged in a circumferential direction, in contact with each other, so as to form a toroidal assembly 4. The toroidal assembly 4 has an inner peripheral portion with which, as shown in FIG. 2, a pair of retainer rings 5 are engaged axially from both sides. The retainer rings 5 are mutually connected at a plurality of positions that are spaced from each other in the circumferential direction.

As can be appreciated from the cross-section of FIG. 2, the small segments 2 and the large segments 3 are each of a divided structure comprised of a center portion 2a, 3a situated at a position corresponding to the center portion of a tire in its width direction for defining the inner surface of the tire center portion at the tread region, and side portions 2b, 3b situated at both side portions of the tire in its width direction for defining the inner surfaces from the tread side portions to the bead portions, respectively. These divided portions can be assembled at their predetermined positions, e.g., by providing the side portions with appropriate positioning/assembling portions, which may be integrally connected or fixed to the inner peripheral side of the center portion 2a, 3a so as to cooperate with the base portions 6, 7 for engagement with the retainer rings 5, and also with the respective side portions 2b, 3b.

Figure 3:
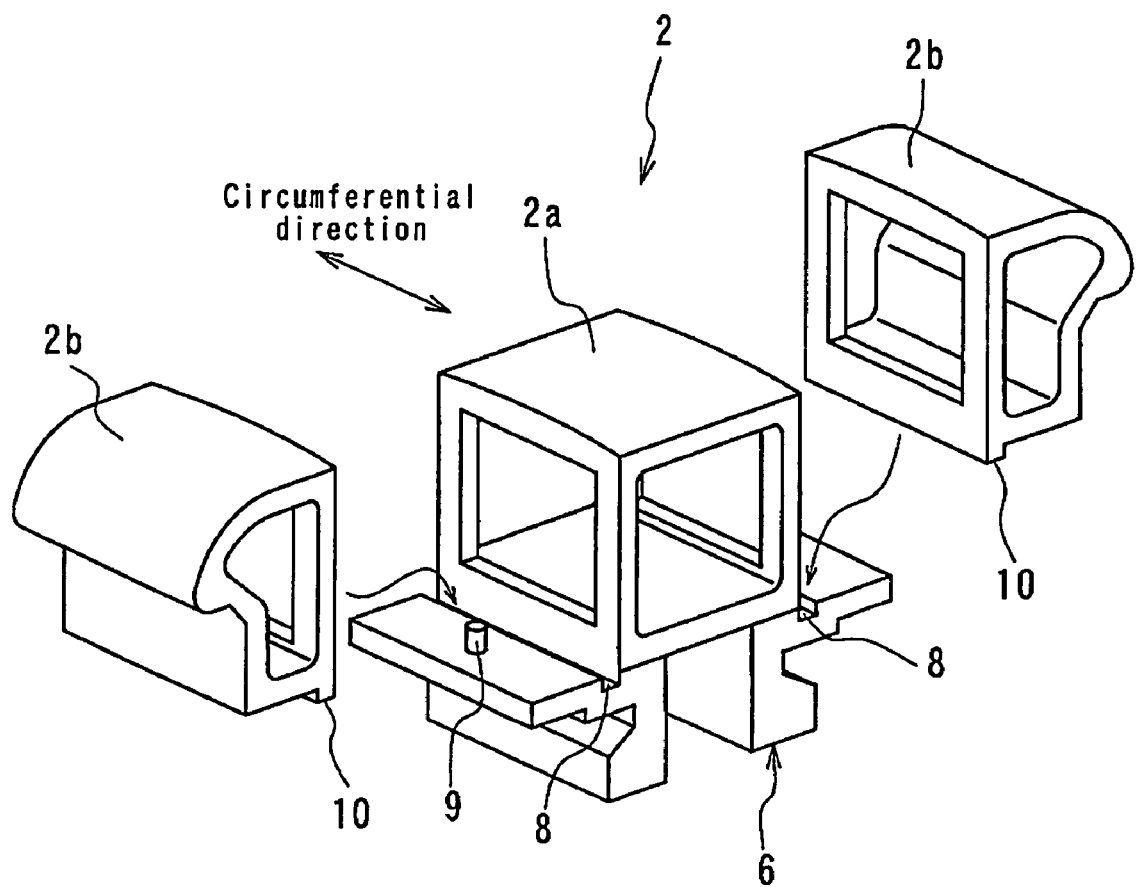
FIG. 3 is an exploded view showing one example of the positioning/assembling portion.

FIG. 3 is an exploded view showing an example of such positioning/assembling portions for the small segment 2. Here, the positioning/assembling portions are comprised of two kinds of male/female fitting portions, wherein the base portion 6 is provided with a pair of grooves 8 extending along the center portion 2a in the circumferential direction of the toroidal assembly 4, and also with a pair of positioning pins 9 projecting radially outwards, while each side portion 2b is provided with ridges 10 that can be fitted into the grooves 8, and also with holes (not shown) allowing the positioning pins 9 to be fitted therein. In this instance, it is possible to perform, with desired accuracy, the positioning of the side portions 2b in the width direction of the segment 2 by the fitting of the ridges 10 into the grooves 8, and the positioning of the side portions 2b mainly in the circumferential direction by the fitting of the positioning pins 9 into the holes in the side portions 2b.

With the positioning/assembling portion of such male/female fitting structure, in the small segment 2 in which the divided portions 2a, 2b are assembled, the center portion 2a can be very easily removed from the side portions 2b, simply by applying to the center portion 2a with a force radially inwards.

Instead of the illustrated example, each side portion 2b may be provided with a plurality of positioning pins for positioning the side portions 2b both in the width direction and in the circumferential direction.

It is of course possible to apply the constitution of the above-mentioned positioning/assembling portion to the large segments 3.

Alternatively, or in addition to the above-mentioned positioning/assembling portion, there may be provided connector means for connecting the side portions to the base portions. For example, as shown in FIG. 2, the connector means may be comprised of one or more male thread members provided on the side of the base portions, and corresponding female thread members provided for the side portions and threadedly engageable with the male thread member. In this instance, it is possible to further improve the positioning accuracy of the divided portions and effectively avoid undesired dislocation of the side portions relative to the center portion.

The connector means may also be comprised, for example, of hooks provided at the tip end of the male thread member that is threaded into the base portion, so that the hooks are engageable into the side portions through elongated holes. In this instance, the male thread member can be rotated by a predetermined angle so that the side portions are tightly connected to the base portions by means of the hooks.

There is further provided a connector means for connecting the pair of retainer rings 5 with each other, which are engaged with the base portions 6, 7. For example, as shown in FIG. 2, the connector means may be comprised of a projection 11 provided for one of the retainer rings 5 to project toward the other retainer ring 5, having an enlarged diameter portion at its tip end, a sleeve 12 projecting from the other retainer ring 5 toward the projection 11, a rod 13 slidably guided by the sleeve 12, a spring 14 urging the rod 13 in a direction away from the projection 11, and a collet 15 that is engageable with the enlarged diameter portion of the projection 11. With such arrangement of the connector means, it is possible to release the connection between the retainer rings 5 and in particular, the engagement of the projection 11 with the collet 15, simply by pushing the head of the rod 13 from the side of the other retainer ring 5 against the force of the spring 14.

Figure 4:
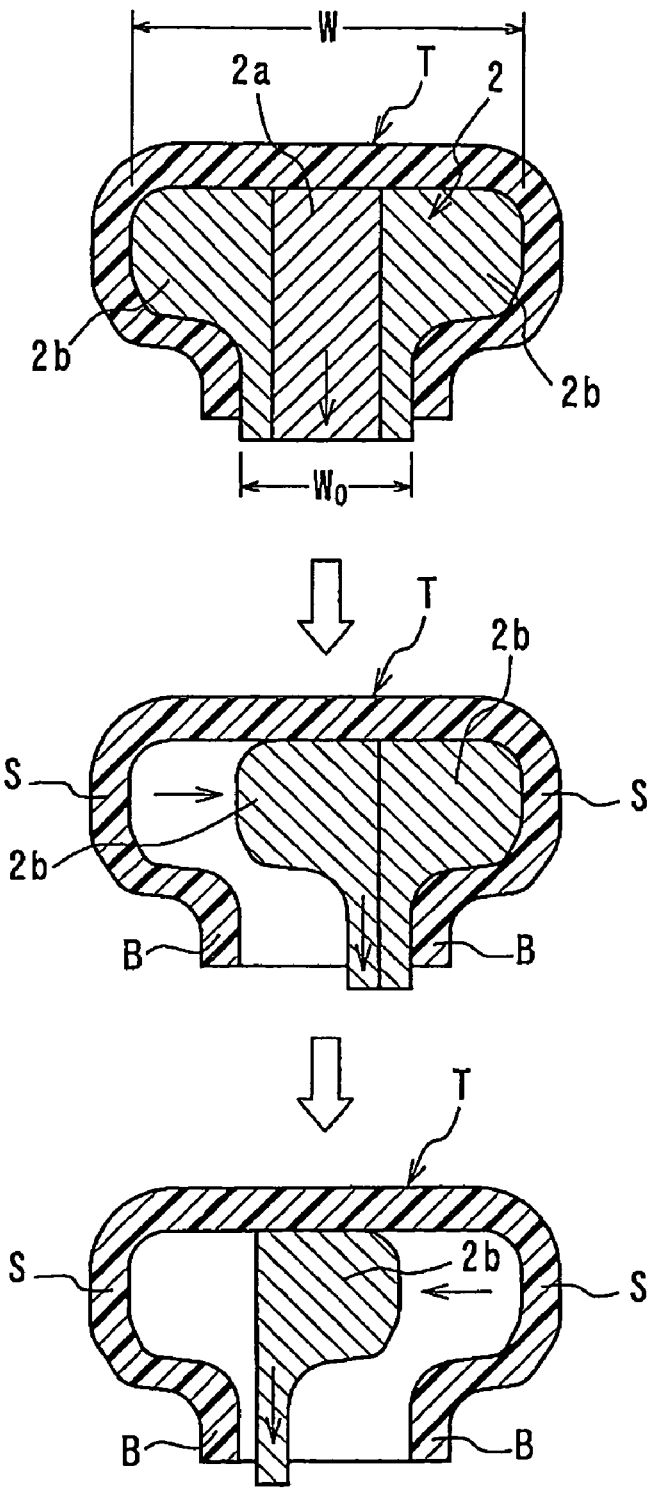
FIG. 4 is a schematic sectional view showing the successive steps of removing the small segments from the tire.

The core for manufacturing pneumatic tires constructed as above is used to form a green tire thereon, and to produce a vulcanized product tire by setting the green tire into a vulcanizing mold together with the core 1. Then, the core 1 can be disassembled and removed from the product tire for example by disconnecting the retainer rings 5 from each other, and performing the following steps with respect to each of the small segments 2, as illustrated in the schematic sectional view of FIG. 4. Thus, in the first place, the center portion is removed from the product tire T. One of the side portions 2*b* is then sufficiently moved toward the other side portion 2*b*, and removed from the tire T with, or without a forced widening of the tire bead portions B. The other side portion 2*b* is then moved toward the opposite side in the width direction to a position in which the interference between that side portion 2*b* and the tire bead portion B can be sufficiently avoided, and removed from the tire T. After all the small segments have been removed in the manner described above, the similar steps are performed with respect to each of the large segments 3. In this way, by initially removing the center portions 2*a*, 3*a* of the segments 2, 3, a sufficient space can be made available within the tire T thereby allowing the side portions 2*b*, 3*b* to be moved in the width direction within the tire T by a sufficient amount even when the side portion 2*b*, 3*b* has a substantial bulging region at its location corresponding to the tire sidewall portion S. It is thus possible to ensure that the side portions 2*b*, 3*b* can be smoothly removed at any time, without causing damages or deformation to the tire T and, in particular, to the bead portions B.

As mentioned above, the removal of the divided portions of the segments 2, 3 is particularly advantageous when each segment 2, 3 has a maximum width W at its portions corresponding to the tire sidewall portions S, and a minimum width $W_0$ at its portions corresponding to tire bead portions B, wherein the maximum width W is larger than the minimum width $W_0$ by at least 40 mm.

INDUSTRIAL APPLICABILITY

It will be appreciated from the foregoing description that, according to the present invention, each segment is divided into a center portion that corresponds to a center portion of the tire in its width direction, and side portions that correspond to both side portions of the tire, respectively, so that the core can be smoothly removed from the product tire without causing damages or deformation to the tire, even when the maximum inner surface width at the sidewall portion of the product tire is substantially larger than the minimum inner surface width at the bead portions thereof.

The invention claimed is:

1. A core for manufacturing pneumatic tires, comprising:
a plurality of segments that are aligned in contact with each other to form a toroidal assembly; and
a pair of retainer rings engageable with said assembly axially from both sides so as to retain said plurality of segments in an assembled state, said core defining an inner surface of a tire from its formation up to completion of vulcanization of the tire,
wherein said segments are each divided into a center portion that corresponds to a center portion of the tire in its width direction, and side portions that correspond to both side portions of the tire, respectively, said center portion and said side portions of each segment being detachably connectable to each other,
wherein each of the segments further comprises a base portion integrally arranged on an inner peripheral side of the center portion, and
wherein the side portions and the base portion of each segment are provided with positioning/assembling portions for the side portions, respectively, the positioning/assembling portions configured such that the side portions and center portion of each segment can be detached from each other while still within the tire after the tire has been vulcanized.

2. The core for manufacturing pneumatic tires according to claim 1, wherein each of said segments has parting surfaces between said center portion and said side portions, said parting surfaces of the segments being arranged in common planes when said segments are aligned as said toroidal assembly.

3. The core for manufacturing pneumatic tires according to claim 1, wherein said toroidal assembly of the segments comprises first segments having a plane width that is substantially constant or gradually decreased radially outwards, and second segments having a plane width that is gradually increased radially outwards, said first segments and said second segments being alternately arranged in a circumferential direction, the first segments being smaller than the second segments.

4. The core for manufacturing pneumatic tires according to claim 1, wherein said positioning/assembling portions comprise at least one kind of male/female fitting portions.

5. The core for manufacturing pneumatic tires according to claim 1, wherein said segments are each provided with a connector means for connecting said side portions to said base portion.

6. The core for manufacturing pneumatic tires according to claim 1, wherein each of said segments has a maximum width at its portions corresponding to sidewall portions of the tire, and a minimum width at its portions corresponding to bead portions of the tire, said maximum width being larger than said minimum width by at least 40 mm.

7. The core for manufacturing pneumatic tires according to claim 2, wherein said toroidal assembly of the segments comprises first segments having a plane width that is substantially constant or gradually decreased radially outwards, and second segments having a plane width that is gradually increased radially outwards, said first segments and said second segments being alternately arranged in a circumferential direction, the first segments being smaller than the second segments.

8. The core for manufacturing pneumatic tires according to claim 2, wherein said segments are each provided with a connector means for connecting said side portions to said base portion.

9. The core for manufacturing pneumatic tires according to claim 3, wherein said segments are each provided with a connector means for connecting said side portions to said base portion.

10. The core for manufacturing pneumatic tires according to claim 4, wherein said segments are each provided with a connector means for connecting said side portions to said base portion.

11. The core for manufacturing pneumatic tires according to claim 2, wherein each of said segments has a maximum width at its portions corresponding to sidewall portions of the tire, and a minimum width at its portions corresponding to bead portions of the tire, said maximum width being larger than said minimum width by at least 40 mm.

12. The core for manufacturing pneumatic tires according to claim 3, wherein each of said segments has a maximum width at its portions corresponding to sidewall portions of the tire, and a minimum width at its portions corresponding to bead portions of the tire, said maximum width being larger than said minimum width by at least 40 mm.

13. The core for manufacturing pneumatic tires according to claim 4, wherein each of said segments has a maximum width at its portions corresponding to sidewall portions of the tire, and a minimum width at its portions corresponding to bead portions of the tire, said maximum width being larger than said minimum width by at least 40 mm.

14. The core for manufacturing pneumatic tires according to claim 5, wherein each of said segments has a maximum width at its portions corresponding to sidewall portions of the tire, and a minimum width at its portions corresponding to bead portions of the tire, said maximum width being larger than said minimum width by at least 40 mm.

* * * * *